March 6, 1951 C. H. RICHARDS 2,544,107
AUTOMATIC AND MANUALLY OPERATED CLUTCH
Filed May 20, 1946 4 Sheets-Sheet 1
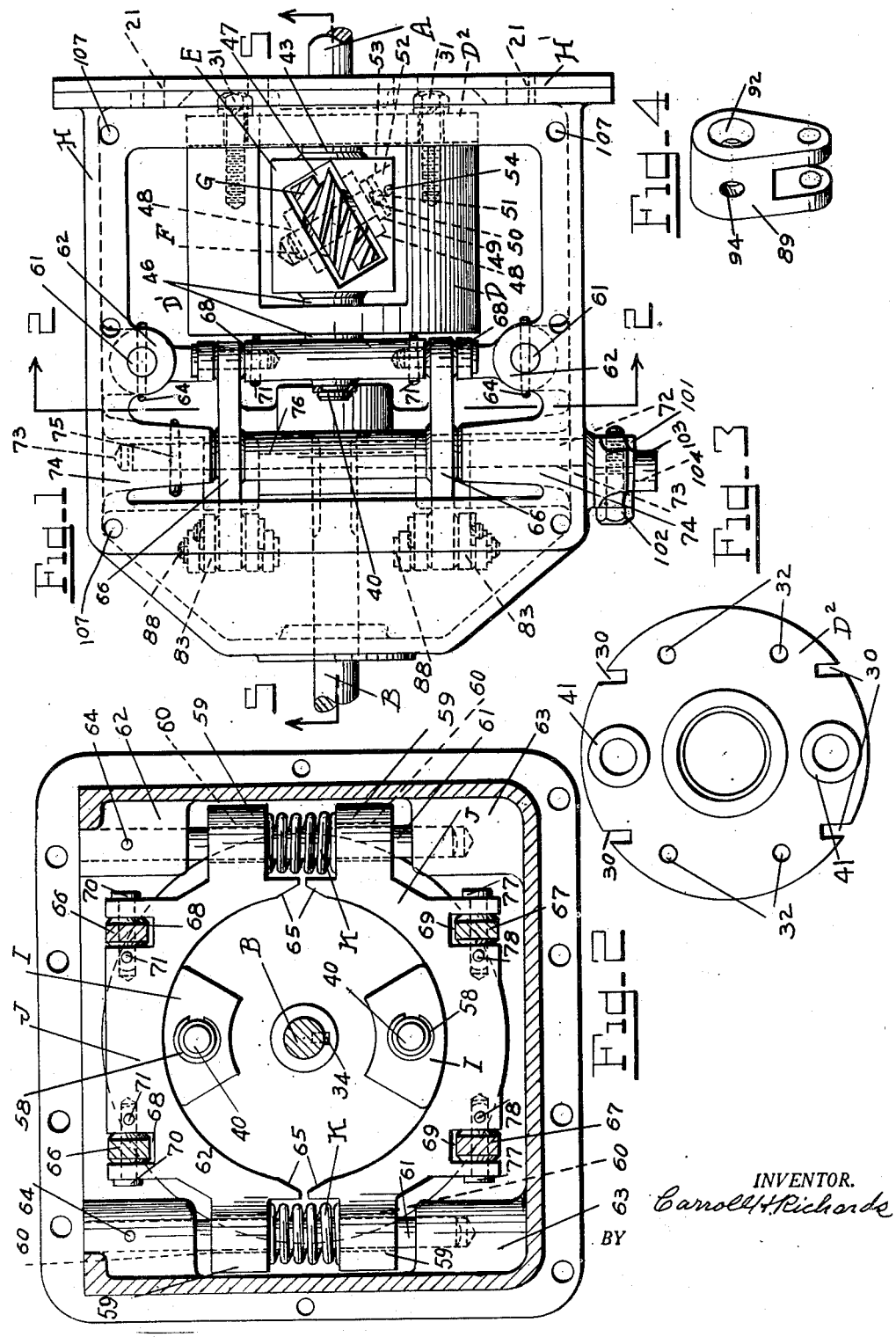
INVENTOR.
Carroll H. Richards
BY

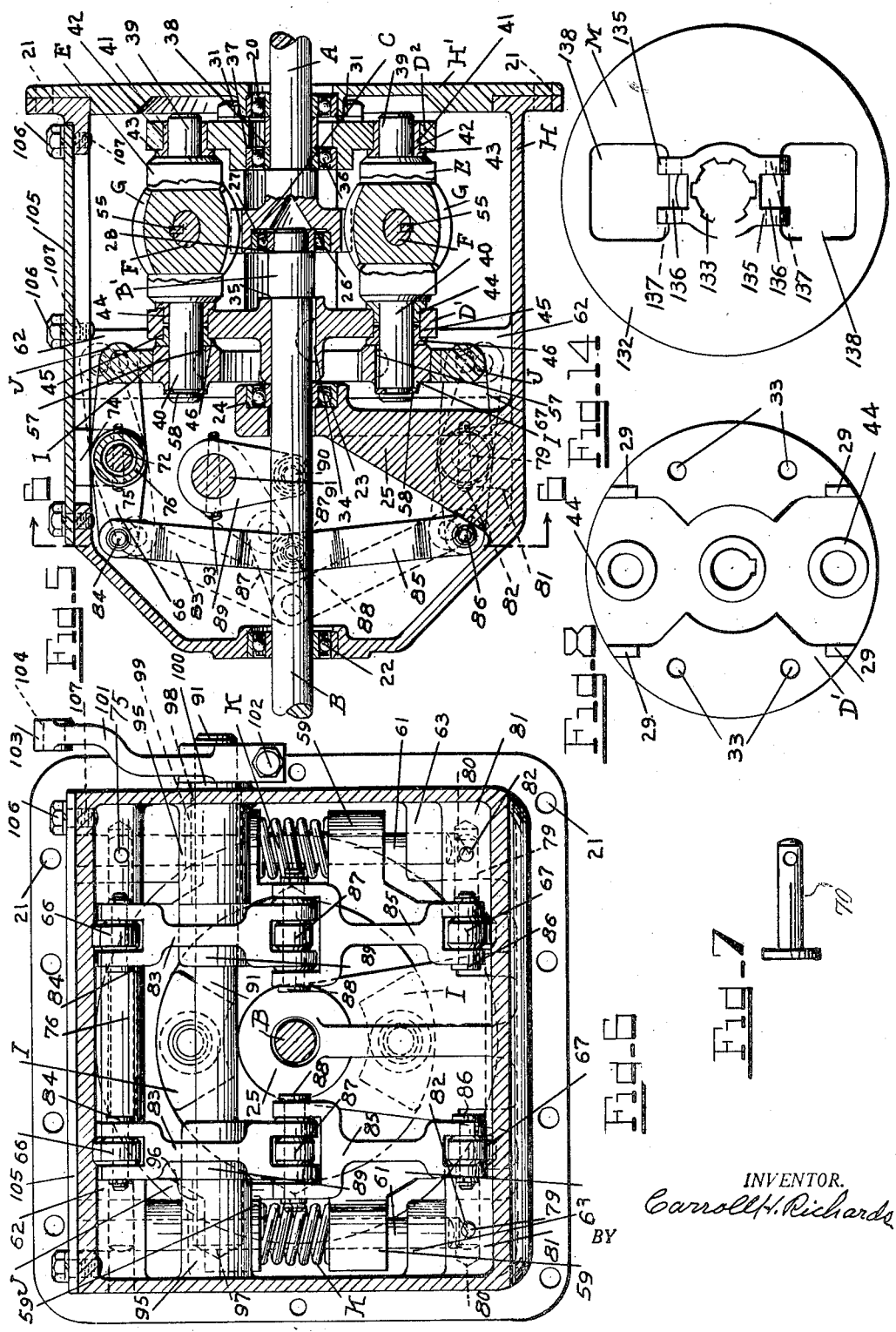

March 6, 1951 — C. H. RICHARDS — 2,544,107
AUTOMATIC AND MANUALLY OPERATED CLUTCH
Filed May 20, 1946 — 4 Sheets-Sheet 3
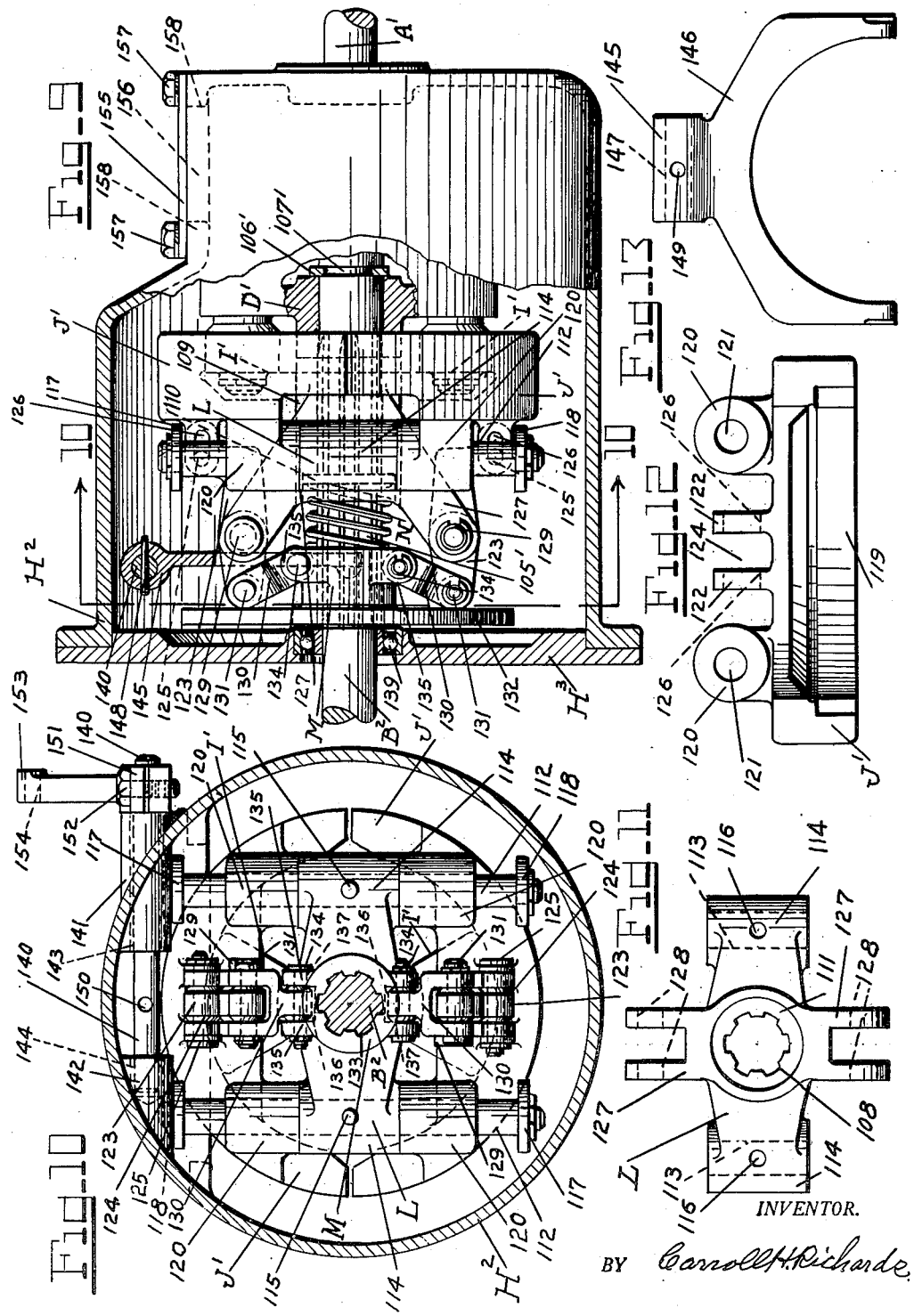
INVENTOR.
BY Carroll H. Richards

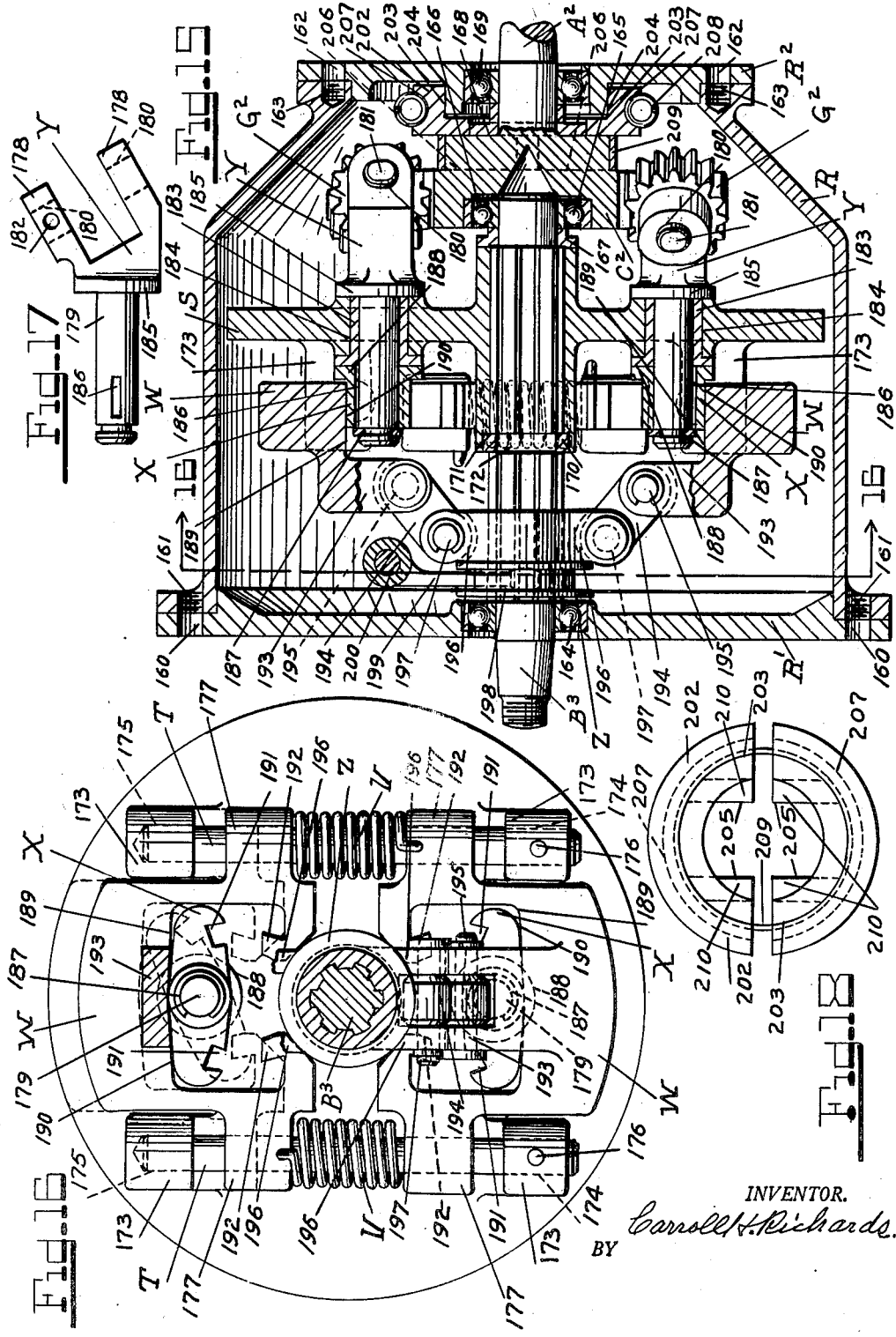

Patented Mar. 6, 1951

2,544,107

UNITED STATES PATENT OFFICE 2,544,107

AUTOMATIC AND MANUALLY OPERATED CLUTCH

Carroll H. Richards, Boston, Mass.

Application May 20, 1946, Serial No. 671,089

21 Claims. (Cl. 192—71)

This invention relates to clutches, which may be engaged or disengaged under load silently at any speed of the driving and driven members and with comparatively little effort, and also clutches of the automatic type which are engaged and disengaged at a predetermined speed, usually of the driving member. Mechanism of this clutch is an outgrowth of the mechanism disclosed in the applicant's Patent No. 2,407,099.

One object of the invention is to provide a clutch particularly for heavy duty work, that may be manually, engaged or disengaged easily and silently under load, regardless of the speed of the driving and driven elements and the magnitude of the load. This adaptation of the invention, would be especially desirable in the construction of heavy armored tanks, heavy trucks and busses, self-propelled rail-cars and boats having high powered engines and employing clutches.

Another object of the invention, is to provide a clutch, that may be caused to be slipped manually or automatically, without excessive or prohibitive wear of the clutch parts. Also to provide a positive engagement of the clutch parts, when the final engagement is made, and adjustable facilities to limit the amount of slippage possible before positive engagement.

Another object of the invention is to provide an automatic clutch, in which one of the engaging members must attain a predetermined speed, before positive engagement is had. Also to provide a clutch of the automatic type, in which a predetermined amount of slippage may or may not be had, before the final engagement or disengagement of the driving and driven members.

Another object of the invention is to provide a clutch of the afore described characteristics, namely: easily and silently declutched or clutched, regardless of the speed of the driving and driven members and the magnitude of the load, that may be operated solely automatically, solely manually or a single clutch unit, that may be operated either manually or automatically.

Another object of the invention is to provide an automatic clutch, of the afore described characteristics, wherein the predetermined speeds at which the driving and driven members are engaged or disengaged, may be changed by the interchanging of usually only one part, or by simple adjustment of the mechanism.

Another object of the invention is to provide an automatic clutch, that by simple means operated manually can be made operative or inoperative.

And another object of the invention is to provide automatic adjustable means to control the so-called "drag" accompanying the performance of automatic clutches, that is the tendency for the driving member of the clutch to transmit driving power to the driven member, when the driving member is rotating and the clutch is not in driving engagement, which is caused by the friction between the parts.

Heretofore, clutches having positive driving connections could not be engaged or disengaged under load at any speed. It has been possible to engage the positive clutch parts at speed by employing means to synchronize the male and female members of the clutch before engagement. But these clutches have not been satisfactory for heavy loads. Since the driving connection in this invention employs gears in mesh or their equivalent, and the gears are rolled in and out of positive driving connections, all the former difficulties of engagement and disengagement at speed and under load have been eliminated.

Automatic clutches employed in the construction of present automotive vehicles cannot be made inoperative manually, and the speed of the driving element be made greater than the predetermined speed, at which the driving and driven members of the clutch become substantially positively drivingly connected. In present automotive vehicles employing automatic clutches, to disconnect the driving power, when the speed of the driving element would cause the driving connections to be completed, a conventional plate clutch is installed in the vehicle to cooperate with the automatic clutch, and the plate clutch is manually operated. The immediate foregoing statements apply particularly to the fluid drive or fluid-flywheel type of automatic clutch. It will be pointed out in the following specification, that one unit of this invention replaces the two units now employed to secure the same characteristics of performance.

The very large majority of automatic clutches employed in the construction of automotive vehicles, once designed to have final driving connection, at a predetermined speed of the driving element, this predetermined speed cannot be changed without substantially changing the entire design of the clutch. Also the amount of slippage that can be had before final engagement of the driving connection cannot be changed without changing the entire design of the clutch. This invention provides a clutch, in which the amount of slippage and the predetermined speed of the driving element at which the final driving connections are had, may be changed by reasonably simple adjustments in the clutch itself and no radical change of the mechanism is required.

The amount of "drag" of present automatic clutches (this term "drag" was explained before herein), cannot be changed without a complete new design of the clutch, usually particularly the housing of the clutch. This invention provides a clutch in which the amount of "drag" can easily be varied by a simple adjustment of the mechanism of the clutch parts.

In the accompanying drawings:

Fig. 1 is a top plan view of a manually operated clutch, with the cover plate of the housing removed, embodying the invention.

Fig. 2 is a sectional view of the clutch taken along line 2—2 in Fig. 1.

Fig. 3 is an inside plan view of one part of the rotor of the clutch shown in Fig. 1.

Fig. 4 is an isometric view of one of the links, employed in the construction of the clutch shown in Fig. 1.

Fig. 5 is a sectional view of the clutch taken along line 5—5 in Fig. 1.

Fig. 6 is a sectional view of the clutch taken along line 6—6 in Fig. 5.

Fig. 7 is a detailed view of pins employed in connecting the links of the clutch shown in Fig. 1.

Fig. 8 is an inside plan view of the other part of the rotor of the clutch shown in Fig. 1.

Fig. 9 is a side elevation of an automatic clutch embodying the invention, disclosing its automatic mechanism, having part of the housing broken away, and with some parts in section.

Fig. 10 is a sectional view of the clutch taken along line 10—10 in Fig. 9.

Fig. 11 is a plan view of a detail of the automatic mechanism of the clutch.

Fig. 12 is an end view of a member of the automatic mechanism of the clutch, which functions in the clutching and declutching performance and is responsive to the centrifugal force caused by the rotations of the driving member of the clutch.

Fig. 13 is a bifurcated member for manually declutching.

Fig. 14 is a plan view of one of the parts of the automatic mechanism of the clutch, including a disc portion, which functions in the manual clutching and declutching.

Fig. 15 is a full longitudinal sectional view, of another design of an automatic clutch, embodying the invention, with some parts in elevation and particularly adapted for light work.

Fig. 16 is a sectional view of the automatic clutch, taken along line 16—16 in Fig. 15, with the housing and shifting finger removed and some parts shown in section not cut by line 16—16.

Fig. 17 is a plan view of one of the swivels employed in the construction of the automatic clutch shown in Fig. 15.

Fig. 18 is a plan view of the brake shoes, which function to eliminate the "drag" afore described and showing the limiting ring in place, to limit the movement of the brake shoes.

Referring to the drawings (see Fig. 5), A is the driving shaft, which is journaled in ball bearing 20 conventionally held in end $H^1$ of the housing H (see Figs. 1 and 5). The end $H^1$ fits into housing H in the conventional manner and the end $H^1$ and the housing H are held together by bolts (not shown) which pierce holes 21 and are threaded into holes of the housing of the power unit.

Driven shaft B is journaled in ball bearing 22, conventionally held in the housing H and ball bearing 23 held in receptacle 24 of projection 25 integral with the housing H. Also driven shaft B is journaled in ball bearing 26, held in receptacle 27, of spur gear C integral with driving shaft A. An enlarged portion $B^1$ of driven shaft B, includes a shoulder 28, which abuts the inner ring of ball bearing 26, and locates ball bearing 26 in receptacle 27 of spur gear C.

A rotatable member D is made in two parts $D^1$ and $D^2$ (see Figs. 1, 3, 5 and 8). Parts $D^1$ and $D^2$ of rotatable member D are located concentrically and prevented from turning relatively to each other, about the common axis of rotation of shafts A and B, by lugs 29 of part $D^1$ fitting into slots 30 of part $D^2$. Parts $D^1$ and $D^2$ are held together by bolts 31, which pierce part $D^2$ in holes 32 and are threaded in holes 33 in part $D^1$ (see Figs. 1, 3 and 8). Part $D^1$ of rotatable member D is keyed to driven shaft B by key and keyways 34. The outer end of the hub of part $D^1$ abuts an end of the inner ring of ball bearing 23 and the inner end of the hub of part $D^1$ abuts a shoulder 35, included in the enlarged portion $B^1$ of shaft B, and the rotatable member D is located longitudinally relatively to shaft B and shaft B is located longitudinally relatively to the housing H. Part $D^2$, of rotatable member D, is mounted on ball bearing 36 in receptacle 37 of part $D^2$ and ball bearing 36 is mounted on driving shaft A. A ring 38 surrounds shaft A. One of the ends of ring 38 abuts the end of the inner ring of ball bearing 36 and the other end of ring 38 abuts an end of the inner ring of ball bearing 20, and the driving shaft A is prevented from moving toward the driving end of the clutch relatively to the housing H.

Trunnion blocks E have shaft portions 39 and 40 integral with them and projecting from opposite ends of the trunnion blocks E. Shaft portions 40 are longer than shaft portions 39. Shaft portions 39, of the trunnion blocks E, are journaled in bushings 41, located in holes 42 in part $D^2$ of the rotatable member D. Bushings 41 have flange portions 43, which abut bosses encircling the shaft portions 39 at one set of ends of the trunnion blocks E and these flange portions 43 are adapted to receive any thrust in their direction from trunnion blocks E. Shaft portions 40, of trunnion blocks E, are journaled in split bushings 44, in holes 45 in part $D^1$ of the rotatable member D. Split bushings 44 have flange portions 46, one set of these flange portions 46, abut bosses encircling shaft portions 40 at one set of ends of trunnion blocks E and these flange portions 46 are adapted to receive thrusts in their direction from trunnion blocks E. Trunnion blocks E are free to oscillate with their shaft portions 39 and 40 in bushings 41 and split bushings 44, in holes 42 and 45, in parts $D^2$ and $D^1$ of rotatable member D respectively.

Trunnion blocks E have apertures 47, in which are journaled shafts F, in ball bearings 48, ball bearings 48 being located in suitable receptacles in trunnion blocks E. Shafts F have heads 49, whose inner sides abut the ends of the inner rings of the adjacent ball bearings 48 and prevents shafts F from movement longitudinally inward toward the apertures 47. In the centers of the heads 49 of shafts F are receptacles 50 to receive balls 51 and part of the balls 51 extend beyond the outer surfaces of the heads 49 (see Fig. 1). Plugs 52 fit tight in holes 53 of the trunnion blocks E and are further held in place by taper pins 54, which pierce the plugs 52 and trunnion blocks in holes not designated. The inner surfaces of plugs 52 contact the balls 51, and prevent the shafts F from movement outwardly longitudinally away from the apertures 47 of trunnion blocks E, yet permit the shafts F to rotate freely in the ball bearings 48.

Keyed to shafts F, by means of keys and keyways 55 are spiral gears G, which mesh with spur gear C. The helical angle of spiral gear G at present is preferably 60° and since spiral gears G, mesh with spur gear C integral with driving shaft A, the axis of shafts F must make angles of 60° with the common axis of rotation of driving shaft A and driven shaft B. The ends of the hubs of helical gears G abut the adjacent ends of the inner rings of ball bearings 48 and ball bearings 48 are prevented from moving out of their receptacles (not designated) in trunnion block E.

Keyed to the longer shaft portions 40, integral with trunnion blocks E, by keys and keyways 57 are shoes I. Shoes I are located longitudinally on shaft portions 40 by the ends of the outer hubs of shoes I abutting the ends of spring rings 58 of the conventional spring ring and groove construction as shown, and by the inner ends of the inner hubs of shoes I abutting the flange portions 46 of the split bushings 44. The outside surface of shoes I or those surfaces farthest away from the center of rotation of the clutch parts are cylindrical, and the curvature of these cylindrical surfaces are the same as the curvature of the inner cylindrical surfaces of guides J. When the inner cylindrical surfaces of guides J contact completely the outer cylindrical surfaces of shoes I, as disclosed in Fig. 2, the clutch is in the declutched relation.

Guides J have lugs 59, which have holes 60. Rods 61 slidably fit into holes 60 of lugs 59 of guides J and guides J are free to slide over rods 61. Rods 61 fit tightly into holes in projections 62 and 63 integral with the housing H and are held in place by taper pins 64, which pierce the rods 61 and the projections 62. The chamfered portions 65, of the inner cylindrical surfaces of guides J (see Fig. 2), are for the purpose of diminishing the amount of travel of the guides J away from the shoes I and have positive driving connections, which will be more fully explained in that which follows.

Springs K encircle rods 61, and have their seats on the adjacent end of the lugs 59 and normally keep the guides J out of contact with shoes I, so that normally the clutch parts are in positive driving connection.

One set of the ends, of links 66 (see Figs. 1, 2 and 5), moveably fit into slots 68 of the upper guide J and pins 70, such as the pin shown in Fig. 7, having heads on one of their ends, as shown and holes, at their opposite ends, adapted to receive a tapered pin, pierce holes in the guide J and the holes in the ends of links 66. Pins 70 fit tightly in the holes in the guide J and loosely in the holes in the ends of the links 66 and links 66 may oscillate about these pins 70 (see Figs. 1 and 2). Taper pins 71 pierce the guides and the holes in pin 70 and hold pins 70 in place.

Links 66 have holes near the center of their longitudinal dimensions, and these holes are pierced by a rod 72, which is held in holes 73 in projections 74 integral with the housing H (see Figs. 1, 5 and 6). Rod 72 is located in place, by a tapered pin 75 which pierces one of the projections 74 and the rod 72. Links 66 are adapted to rock on rod 72. Links 66 are located longitudinally on rod 72, by one set of the sides of links 66 abutting the ends of projections 74 and by the other set of sides of links 66 abutting the ends of a spacer tube 76, which is supported by rod 72 (see Figs. 1, 5 and 6). One set of ends of links 67 (see Figs. 1, 2, 5 and 6) fit moveably into slots 69 of the lower guide J and pins 77, such as shown in Fig. 7, enter holes in the lower guide J and holes in the ends of links 67. Pins 77 fit tightly in the holes in the lower guide J and loosely in the holes in the ends of links 67 and links 67 may oscillate about these pins 77. Taper pins 78 pierce the lower guide J and the holes in the pins 77 and hold pins 77 in place.

Links 67 have holes near the center of their longitudinal dimensions and these holes are loosely pierced by pins 79, such as shown in Fig. 7. Pins 79 fit tightly into holes 80 in projections 81 integral with the housing H and are held in place by taper pins 82, which pierce projections 81 and the holes in pins 79. Links 67 are free to rock on pins 79 and are located longitudinally on pins 79, by one set of the sides of links 67 abutting the ends of projections 81 and by the other set of sides of links 67 abutting the inside surface of the heads of pins 79 (see Fig. 7).

The ends of links 66, opposite their ends that fit into the slots 68 of the upper guide J, fit into one set of the bifurcated ends of links 83 and are free to move therein. Pins 84 enter holes in the ends of links 66 that fit into the bifurcated ends of links 83, and holes in the furcations of links 83 and links 66 and links 83 are free to oscillate about pins 84. These pins 84 are held in place by heads on one set of ends of the pins 84, being larger in diameter than the holes in links 83, into which pins 84 fit and by the conventional spring ring and groove construction at the set of ends of pins 84 opposite their head ends.

The ends of links 67 opposite their ends, that fit into slots 69 in the lower guide J, fit into the bifurcated ends of links 85 and are free to move therein. Pins 86 enter holes in the ends of links 67, that fit into the bifurcated ends of links 85 and holes in the furcations of links 85 and links 67 and links 85 are free to oscillate about pins 86. These pins 86 are held in place, by their heads on one set of ends of pins 86, being larger in diameter than the holes in links 85, into which pins 86 fit and by the conventional spring ring and groove construction at the ends of pins 86 opposite their head ends. The other bifurcated ends of links 83 fit into bifurcated ends of links 85, the furcation of links 85 being farther apart than the furcations of links 83 (see Fig. 6). Links 87 fit into the bifurcations of links 83, which in turn fit into the bifurcations of links 85, which has just been explained. Pins 88 enter holes in the bifurcations of links 85 and links 83 and the end of link 87, and links 83, 85 and 87 are free to oscillate about pin 88. These pins 88 are held in place by their heads on one set of their ends, being larger in diameter than the holes in the links 83, 85, and 87 into which pins 88 fit and by the conventional spring ring and groove construction at the ends of pins 88 opposite their head ends.

The other ends of links 87 fit into the bifurcations of links 89 (see Figs. 4 and 5). Pins 90 enter the holes in the ends of links 87, that fit into the bifurcation of links 89 and holes in the bifurcations of links 89 and the links 87 and 89 are free to oscillate about pins 90. These pins 90 are held in place by heads on one set of their ends and by the conventional spring ring and groove construction at the ends of pins 90 opposite their head ends.

Links 89 are supported by a shaft 91 in holes 92 (see Fig. 4) and are located on and rotatively attached to shaft 91 by tapered pins 93, which pierce the shaft 91 and links 89 in holes 94 of links 89 (see Fig. 4).

Shaft 91 is journaled at one of its ends in one of the projections 95 (Fig. 6) integral with the housing H, in bushing 96 located in hole 97 in projection 95 and is journaled at its opposite end in the other projection 95 integral with the housing H, in bushing 98 located in hole 99 of this projection 95. Hole 99 located in this projection 95, also passes through the wall of the housing H and is surrounded by a boss 100, integral with the outside of the housing H. Bushing 98 terminates flush with the face of boss 100 and shaft 91 extends beyond the face of boss 100. The hub of a crank 101 fits over this extending portion of the shaft 91 and is rotatively attached to shaft 91 by the conventional construction, in which the hub is split on one side and a bolt 102 loosely pierces the portion of the hub on one side of the split and is threaded in that portion of the hub on the opposite side of the split (see Figs. 1 and 6). The opposite end of the crank 101 is provided with an enlarged boss portion 103 having a hole 104 adapted to receive a pin to connect a link (not shown) to crank 101 for the purpose of transmitting motion to the crank 101.

A cover plate 105 is fastened to the housing H, by means of bolts 106 threaded into holes 107 in the flanges of the housing H (see Figs. 1, 5 and 6). Bolts 106 have a conventional type of lock-washer under their heads to prevent them from turning, when the bolts are tightened to secure the cover plate 105 to the housing H.

The immediate foregoing described mechanism is that of a manually operated clutch embodying the invention and its operation is described in that which follows. Assume that the driving shaft A is revolving in either direction of rotation, that the links 83, 85, 87, 89 are in their positions as shown by full lines and that particularly the inside cylindrical surfaces of guides J coincide completely with outside cylindrical surfaces of the shoes I (see Fig. 2). Also, that springs K are depressed as shown in Figs. 2 and 6. With the parts of the mechanism in the positions just described, the revolving of shaft A will not impart any rotation to the rotatable member D. The part $D^1$ of the rotatable member D, being keyed to driven shaft B by key and keyways 34, no rotation will be imparted to driven shaft B. Therefore the parts of the clutch are in relative positions to each other, such that the driving shaft A cannot transmit its rotation to the driven shaft B and the crank 101 has been moved into the position to cause the relative positions of the parts of the clutch as just described. Since the inner cylindrical surfaces of guides J are in complete contact with the outer cylindrical surfaces of shoes I, the shaft portions 40 integral with the trunnion blocks E cannot turn in their bearings consisting of split bushings 44 in holes 45 in part $D^1$ of rotatable member D. Shaft portions 39, integral with trunnion blocks E, cannot turn in their bearings consisting of bushing 41, in holes 42 in part $D^2$ of rotatable member D. Because shaft portions 39 and 40 cannot turn, for the foregoing reasons, trunnion blocks E cannot tilt, and therefore hold helical gears G to mesh properly with spur gear C integral with driving shaft A and spur gear C due to the rotation of driving shaft A cause spiral gears G to idle. Since spiral gears G are keyed to shaft F by keys and keyways 55, shaft F rotates in ball bearings 48 in the trunnion blocks E and no driving force is transmitted to rotatable member D, which through its part $D^1$ is keyed to driven shaft B by key and keyways 34 and therefore no driving force is transmitted to driven shaft B.

Due to the force necessary to idle helical gear G, there would be a tendency to rotate rotatable member D, but this is resisted by the inner cylindrical surface of the guides J contacting the outer cylindrical surfaces of shoes I with sufficient pressure to function as the clutch brake.

Assuming that driving shaft A is rotating, by moving crank 101 away from the observer, as viewed in Fig. 6, springs K act and since they push against the ends of lugs 59, integral with guides J, lugs 59 having holes 60 which are slidably pierced by rods 61, slide over rods 61 and the inner cylindrical surfaces of guides J move away from outer cylindrical surfaces of the shoes I. This movement of guides J is transmitted through pins 70 to move links 66 which rock on rod 72, and through pins 77 to move links 67 which rock on pins 79, afore described. This rocking motion of links 66 and 67 is caused by the movement of link 89, by movement of the crank 101 transmitted to link 89 through shaft 91 aided by the springs K. The rocking of links 66 and 67 causes links 83 and 85 to take up positions at or between their full line positions and broken line positions, shown in Fig. 5.

When links 83 and 85 have taken up their positions shown in broken lines, by the movement of crank 101 and the aid of springs K, which has been described in the foregoing, links 66 and 67 have rocked to their limit in one direction, also shown in broken lines (see Fig. 5) and the inner cylindrical surface of guides J have taken up their farthest position away from the outer cylindrical surfaces of shoes I. Now the driving shaft A will transmit the drive to driven shaft B through spiral gears G, to trunnion block E, and rotatable member D. Gear C, being integral with shaft A causes the trunnion blocks E to tilt in the opposite direction to the drive, and since the action of the spiral gears is practically the same as racks turning about the center of oscillation of the trunnion blocks E, the teeth of the spiral gears G operate practically like spur gears with infinity as their centers or as racks just described. The teeth of spiral gears G, can be cut so that the tops of the teeth of the helical gears can press against the bottoms of the tooth spaces of the spur gear C, when the trunnion blocks tilt. When the tilting of the trunnion blocks E is permitted, the tops of the teeth of the spiral gears G press against the bottoms of the tooth spaces of the spur gear C and spiral gears G can not idle and there is a lockup of spiral gears G and spur gear C. Then driving shaft A transmits the drive to driven shaft B.

When the trunnion blocks E tilt, shoes I also tilt and, if guides J are at their farthest point away from shoes I, rotatable member D rotates, carrying shoes I with it and the shoes I clear the guides J, and driving shaft A through the mechanism drives shaft B. To declutch, crank 101 pulled toward the observer as shown in Fig. 6, rotates shaft 91 to which the crank 101 is rotatively attached. Links 89 also being rotatively attached to shaft 91 turn with shaft 91 and pull links 87 along toward the driving end of the clutch. The travel of links 87 pulls links 83 and 85 toward their full line positions (see Fig. 5). This movement of links 83 and 85 rock links 66 on rod 76 and links 67 on pins 82. This rocking of links 66 and 67 causes guides J, to which links 66 and 67 are attached by pins 70 and 77 respectively, to contact shoes I and when guides J take up their position relatively to shoes I as shown in Fig. 2, namely: that the inner cylindrical surfaces of guides J, completely contact the outer cylindrical surfaces of shoes I, the declutching is completed and the trunnion blocks E are held in a fixed position relatively to gear C, so that the rotation of gear C meshing with spiral gears G, causes the gears G to idle and no driving power is transmitted to driven shaft B.

It has been stated before herein, that the gears are rolled in and out of position to cause a connection or disconnection of the driving and driven members of the clutch, and this is caused by the tilting of the trunnion block E, in one direction to complete a connection and the opposite direction to complete a disconnection, for the same direction of the drive. When a disconnection is being accomplished, the force required to be applied to the crank 101 is comparatively small, due to the facts, namely: that the toggle joint formed by links 83 and 85 and the inclined plane functioning of the inner cylindrical surface of the guides J, as they contact the outer cylindrical surfaces of the shoes I, gives the operator of the crank 101, a great mechanical advantage. The connection of the driving and driven members is permitted by the operating of the crank 101, as the spiral gears G are rolled into driving position by the rotation of driving gear C. The clutch may be slipped without prohibitive wear by the operator holding the crank back and not permitting the helical gears G to roll into final driving position, and during this slipping performance links 83 and 85 are not permitted to take up their full line positions, but are stopped some place between their broken line positions (see Fig. 5) to obtain the desired slippage. The entire mechanism is lubricated by running in a bath of lubricant contained in the housing H.

Chamfers 65 of the guides J, function to diminish the distance that guides J must be moved away from shoes I, so that shoes I will clear the guides J, when spiral gears G are in driving positions since it should be obvious that if the chamfers 65 were not had, the corners of the guides J could strike shoes I. These chamfers 65 will not cause any clicking noise, when the guides J completely contact the shoes I, if the length of the shoes I are sufficient to span the gap formed by the chamfers 65. But, if the clutch is expected to be submitted to a great amount of slipping performance the upper and lower guides J, should be telescoped, where they meet to prevent a clicking noise during the slippage performance.

The following is a description of the invention embodied in an automatic clutch and particularly illustrated in Figs. 9, 10, 11, 12, 13 and 14. In this construction the driving and driven shafts comparable to the manually operated clutch, afore described are reversed, the part $D^1$ of rotatable member D being rotatively attached to the driving shaft $B^2$ instead of driven shaft $A^1$. The parts: gear C, trunnion blocks E, the shaft portions 39 and 40, spiral gears G and rotatable member D etc. are identical in this construction with that of the manually operated clutch and are not shown. For the purpose of facilitating the assembly of the mechanism, the shaft $B^2$, now the driving shaft, is the same diameter throughout its length except that it is smaller in diameter in that portion, which fits into ball bearing 26 (see Fig. 5) and the shoulder 27, which abuts the inner ring of ball bearing 26, is formed by the difference in diameters of the main part of driving shaft $B^2$ and that portion of shaft $B^2$ which fits into ball bearing 26. Shaft B, in the manually operated clutch construction, has three different diameters over its length (see Fig. 5), while driving shaft $B^2$ has only two different diameters, except for the splined portion 105' (see Fig. 9). In the manually operated clutch, the rotatable member D is located on shaft B, in one direction longitudinally by a shoulder 35 on shaft B abutting the end of the inner hub of part $D^1$ of rotatable member D (see Fig. 5). A spring ring 106', fitting into an annular groove 107' in driving shaft $B^2$ and one side of ring 106', abutting the end of the inner hub of part $D^1$ of rotatable member $D^1$, functions the same in the automatic clutch construction, as shoulder 35 in the manually operated clutch. Shoes $I^1$ are keyed to and held on shaft portions 40 of the trunnion blocks E in the automatic construction in exactly the same manner that shoes I are keyed to and held on shaft portions 40 in the manually operated construction (see Figs 6 and 9).

A spider L is permanently splined to driving shaft $B^2$ by splines 105' and spline ways 108 (see Figs. 9 and 11), and is located on shaft $B^2$, from movement toward the driven end of the clutch, by the end of the hub 109 of the spider L, abutting the outer end of the hub part $D^1$ of rotatable member D. A split ring 110 fits into an annular groove (not designated) in the portion of shaft $B^2$, having splines 105' and into annular receptacle 111 in the spider L (see Fig. 11), and locates the spider L and prevents its movement toward the driving end of the clutch along shaft $B^2$.

Rods 112 fit tightly in holes 113 in lugs 114 of the spider L and are held in place by tapered pins 115 which enter the holes 116 in the lugs 114 and holes in the rods 112. Integral with rods 112 are heads 117 at one set of their ends. The opposite ends of the rods 112 are of smaller diameter than the main body of the rods 112 and where the larger diameters of these rods terminate and the smaller diameters begin, shoulders are formed. Rings 118 fit snugly on the smaller diameters of the rods 112 and the sides, of the rings 118, abut the shoulders formed by the two different diameters of the rods 112. The rings 118 are held tightly up against the shoulder of the rods 112 by the conventional spring ring and groove construction on the small ends.

Guides $J^1$, similar to guides J in the manually operated clutch, function both as guides and weights, responsive to the centrifugal force caused by the rotation of the driving shaft with which guides $J^1$ rotate, as will be explained more fully in that which follows. The inner cylindrical surfaces 119 (Fig. 12) of the guides $J^1$ have the same curvature as the external cylindrical surfaces of shoes $I^1$. When the clutch is declutched the inner cylindrical surfaces 119 of guides $J^1$ fit the external cylindrical surfaces of shoes $I^1$ completely (see Figs. 9, 10 and 12). Lugs 120, integral with guides $J^1$, have holes 121 into which rods 112 slidably fit. Also integral with each of the guides $J^1$ are spaced projections 122 providing a slot 124 therebetween (Fig. 12). One set of the ends of bent links 123 fit movably into slots 124. Pins 125 loosely pierce holes in the ends of the bent links 123 and also elongated holes 126 in projections 122 and pins 125 can turn and move longitudinally in elongated holes 126. Pins 125 are held in place by heads at one of their ends, larger than the holes they pierce and by the conventional spring ring and groove construction on the ends opposite their head ends. Bent links 123 are movably attached to guides $J^1$ by pins 125.

Bifurcated projections 127 are integral with the spider L and have holes 128 near their ends. Bent links 123 fit movably into the bifurcations of the projections 127 and pins 129 pierce the holes 128 of the projections 127 and holes in the mid portions of bent links 123 so that links 123 are free to rock on pins 129. Pins 129 are held in position by heads, on one set of their ends, that are larger than the holes 128 of the projections 127 and by the conventional spring ring and groove constructions on the ends of pins 129 opposite their head ends. The other ends of bent links 123 fit movably into the bifurcations at the ends of links 130. Pins 131 pierce the bifurcations of links 130 and one set of the ends of bent links 123 and fit loosely in holes therein so that links 123 and 130 may oscillate about pins 131. Heads on one set of ends of the pins 131, are larger than the holes pierced by them and the conventional spring ring and groove construction on the ends of pins 131 opposite the head ends, hold pins 131 in place and bent links 123 and 130 are connected to each other and may move relatively to each other about pins 131.

A member M has a disc portion 132 (Fig. 9) integral with it and is slidably splined on splined portion 105' of driving shaft $B^2$, by spline-ways 133 fitting over splines 105' of shaft $B^2$ (see Figs. 9 and 14) and is connected to links 130 by pins 134. Projections 135 are integral with member M and have slots 136 therebetween into which the ends of links 130, movably fit. Pins 134 loosely pierce holes in the ends of the links 130 and the holes 137 in the projections 135, links 130 being free to oscillate about pins 134. Pins 134 are held in place by heads on their ends being larger than the holes they pierce and by the conventional spring ring groove construction on their ends opposite their head ends. Apertures 138 in disc portion 132 of member M are for the purpose of preventing the ends of bent links 123 and links 130 striking disc portion 132.

A spring N encircles the splined portion of shaft $B^2$ and extends between the inner end of member M and the outer side of split ring 110 (see Fig. 9). The function of this spring is to urge the clutch parts to a declutched relation.

The entire mechanism is housed in housing $H^2$ and the housing is smaller at the driving end than the driven end. Rotatable member D and its immediate mechanism is housed in the small part of the housing $H^2$ and the mechanism, functioning to cause the clutch to be automatic, is housed in the large part of the housing. At the driving end of the clutch, the housing has a head $H^3$, which fits conventionally into the main part of the housing and bolts and holes (not shown) pierce the flange of the part $H^2$ of the housing and the head $H^3$ of the housing and are threaded into the housing of the driving unit (not shown) and parts $H^2$ and $H^3$ of the housing are held firmly together by these bolts. Driving shaft $B^2$ is journaled in ball bearing 139, conventionally held in the head $H^3$ of the housing.

A shaft 140 enters a boss portion 141 and partially enters a boss portion 142 of the housing $H^3$. Bushings 143 and 144 form bearings for the shaft 140 in boss portions 141 and 142 respectively. Hub 145, of shifting fingers 146 (Figs. 9 and 13), is pierced by shaft 140 in a hole 147 and shifting fingers 146 are located on shaft 140 and attached to it by taper pin 148 piercing hole 149 in the hub 145 and hole 150 in shaft 140. A portion of shaft 140 protrudes from boss portion 141 of the housing and has attached to it the hub of crank 151, which shaft 140 pierces. The hub of the crank 151 is split and held tight on shaft 140 by a bolt 152. Crank 151 at its extreme outer end has a boss portion 153 having a hole 154 adapted to receive a pin to connect a link to crank 151 for the purpose of transmitting motion to crank 151.

A cover plate 155 (Fig. 9) fits on the top of the small portion of housing $H^2$ and covers aperture 156. Bolts 157 pierce holes in the cover plate 155 and are threaded in the flange portions 158 of the housing $H^2$.

The declutching positions of the parts of the mechanism just described are shown in Figs. 9 and 10. When the declutching relative positions of the parts are had, their relative positions are as disclosed in Figs. 9 and 10. The spring N holds member M and its associated mechanism in a position to cause the inner cylindrical surfaces 119 of guides $J^1$ to engage outer cylindrical surfaces of shoes $I^1$ completely. When cylindrical surfaces 119 of guides $J^1$ fit outer cylindrical surfaces of the shoes $I^1$ as just described, trunnion blocks E cannot tilt in their bearings and the spiral gears G idle and no driving force is transmitted to driven shaft $A^1$ by rotation of driving shaft $B^2$ in either direction of rotation.

The force offered by spring N to cause member M to take up the position as shown in Figs. 9 and 10 determines the speed at which driving shaft $B^2$ must revolve to cause the centrifugal force, due to the rotation of guides $J^1$, to overcome the force of spring N. When this predetermined speed of shaft $B^2$ is reached, guides $J^1$ move outward away from the center of rotation and are guided by rods 112. The outward movement of guides $J^1$ continues until the outer ends of lugs 120 carried thereby contact the inner sides of the heads 117 of the rods 112 and the inner sides of the rings 118 attached to one set of ends of rods 112, as heads 117 and rings 118 function as stops to limit the outward movement of the guides $J^1$. The movement of guides $J^1$ outward causes the bent links 123 to be rocked on pins 129 which are held in projections 127 of spider L. This rocking of bent links 123 causes their ends, connected to links 130 by pins 131, to move inwardly toward the center of rotation and imparts this motion to the bifurcated ends of links 130 through pins 131 about which, both bent links 123 and links 130 are free to oscillate. This motion is transmitted to member M and causes member M to move over the splines 105' of shaft $B^2$ toward the driven end of the clutch and to compress spring N, since spring N has one of its seats on the inner end of member M.

The guides $J^1$, having reached their outward limit positions away from the center of rotation, the trunnion blocks E are permitted to tilt about their axes, since the shoes $I^1$ keyed to the long shaft portions 40 of the trunnion blocks E may be tilted and clear the inside cylindrical surfaces 119 of guides $J^1$. Rotatable member D carrying the trunnion block E, about the spur gear C, during the rotation of rotatable member D splined to driving shaft $B_2$, causes the tops of the teeth of the spiral gears G to contact the bottom of the tooth spaces of spur gear C, if the shoes $I^1$ are permitted to be tilted, which in turn permits the trunnion blocks E to tilt on their axes and turn the axes of the spiral gears G, carried by the trunnion blocks E, about the axes of the shaft portions of trunnion blocks E, which permits the tops of the teeth of spiral gears G to contact the bottoms of the tooth spaces of spur gear C and driving connection is had between the driving shaft $B^2$ and driven shaft $A^1$, as long as the tops of teeth of the spiral gears G, contact the bottom of the tooth spaces of spur gear C. It is not necessary to cut the spiral gear teeth and spur gear teeth so that the tops of the spiral gear teeth fully contact the bottom of the tooth spaces of the spur gear C to secure a lockup of the gearing, but it is the preferable way to cut the teeth.

It was stated heretofore, that when the speed of driving shaft $B^2$ and the guides $J^1$, which revolves with shaft $B^2$, attained a speed at which the centrifugal force caused by the rotation of guides $J^1$ (which also function as weights, responsive to centrifugal force), that guides $J^1$ moved immediately outward to the limit of their outward movement. The reason for this performance of guides $J^1$ is because the spring N and chain of links are so designed that once the initial force of the spring N is overcome and the spring N is compressed slightly, the centrifugal force, due to the movement of the guides $J^1$ farther away from the center of rotation, increases and the mechanial advantage of the guides $J^1$ over the spring N increases due the changing positions of the chain of links and the sum of these increases is greater than the increased force of the spring due to its compression. With the design as just described, there is practicaly no slippage performance between the declutching and clutching relations of the clutch.

Assuming, that the clutch is in the clutching relation and driving shaft $B^2$ is rotating at a speed to keep the guides $J^1$ to their outward limit positions, if the speed of shaft $B^2$ be decreased sufficiently to a predetermined speed, the centrifugal force exerted by the rotation of guides $J^1$, transmitted through the chain of links to compress the spring N will be decreased, and spring N will elongate and push member M over splines 105' on driving shaft $B^2$. This movement of member M will cause the bifurcated ends of links 130 to be moved outwardly away from the center of rotation which in turn cause the ends of bent links 123, fitting into the bifurcation of links 130 and connected to links 130 by pins 131, to be moved outwardly away from the center of rotation. Bent links 123, due to the movement of their ends outward, as just described are rocked on pins 129. This rocking of bent links 123 causes the ends of bent links 123, attached to projections 122 of guides $J^1$, to be moved inwardly toward the center of rotation and forces guides $J^1$ to move inwardly toward the center of rotation. Guides $J^1$ moving inwardly cause the lugs 120 carried thereby to slide over rods 112 until the inner cylindrical surfaces 119 of guides $J^1$ contact the outer cylindrical surfaces of shoes $I^1$. This movement inwardly of guides $J^1$ contacting the shoes $I^1$, causes the shoes $I^1$ to tilt until the inner surfaces of guides $J^1$ contact completely the outer cylindrical surfaces of shoes $I^1$. The tilting of shoes $I^1$, which are keyed to the long shaft portions 40 of the trunnion blocks E (see Fig. 5), tilt the trunnion blocks E so that spiral gears G are moved into positions in which they idle and do not transmit any driving force to gear C and the clutch parts are in the declutching relation to each other.

If during the performance, when the spring N is depressed and the driving shaft $B^2$ is transmitting its rotations to driven shaft $A^1$, it would be required to cause a declutching of the clutch, this could be accomplished by pushing crank 151 away from the observer when viewing Fig. 10. This movement of crank 151 rotates shaft 140. When shaft 140 is rotated as just described, shifting fingers 146 rotate therewith and the semi-circular projections on the tips of the fingers (see Fig. 13) contact the disc portion 132 integral with member M and member M is moved over the splines 105' of the driving shaft $B^2$ and this movement of member M causes the inner cylindrical surfaces 119 of guides $J^1$ to completely contact the outer cylindrical surfaces of shoes $I^1$ and the declutching relation exists and declutching has been accomplished manually.

Figs. 15, 16, 17 and 18 disclose a design of an automatic clutch embodying the invention and particularly adapted for light duty, such as would be required in the construction of passenger automotive vehicles. In this construction a housing R, encloses the mechanism and functions as a support for the main bearings of the driving shaft $B^3$ and the driven shaft $A^2$ and also functions as a lubricant container. The housing R is made in three parts, having heads $R^1$ and $R^2$. Head $R^1$ is bolted to the main body of the housing by bolts (not shown), which pierce the head $R^1$ through holes 160 and are threaded in holes 161 in the main body of the housing. And similar bolts (not shown) pierce the head $R^2$ through holes 162 and are threaded in holes 163 in the main body of the housing and head $R^2$ is firmly bolted to the main body of the housing. Both heads $R^1$ and $R^2$ fit into the main body of the housing in the usual conventional manner.

Driving shaft $B^3$ is journaled in ball bearing 164, conventionally held in head $R^1$ of the housing, and is journaled at its extreme inner end in ball bearing 165, in receptacle 166 in spur gear $C^2$, integral with driven shaft $A^2$. The mid portion of driving shaft $B^3$ has spline and splineways, whose outside diameter is greater than the diameters of the two ends of driving shaft $B^3$. The outer end of driving shaft $B^3$ is formed to receive a conventional face plate or its equivalent, that will facilitate its connection with the shaft of the power unit, and the inner end of driving shaft $B^3$ fits into the inner ring of ball bearing 165.

A spider S is splined to the mid portion of driving shaft $B^3$ and a side of ring 167, pierced by the small inner end of driving shaft $B^3$, abuts the ends of the splines of driving shaft $B^3$, and the end of the inner hub of spider S. The other side of ring 167 abuts the inner ring of ball bearing 165, which is held in receptacle 166 of driven spur gear $C^2$. One side of ring 168, pierced by the outer end of driven shaft $A^2$, abuts the outer side of spur gear $C^2$ and the other side of ring 168 abuts the inner ring of ball bearing 169; ball bearing 169 journalling driven shaft $A^2$ and being conventionally held in head $R^2$ of the housing. Thus, driving shaft $B^3$, spider S, ring 167, spur gear $C^2$ and driven shaft $A^2$ are all prevented from moving longitudinally toward the driven end of the clutch.

The end of the hub of the spider S toward the driving end of the clutch, has an annular receptacle 171 into which fits a split ring 170. Split ring 170 fits into an annular groove 172 in driving shaft $B^3$ and the spider S is prevented from moving longitudinally along driving shaft $B^3$ toward the driving end of the clutch. The ends of the splines of driving shaft $B^3$, at the driving end of the clutch, abut the inner ring of ball bearing 164 to prevent driving shaft $B^3$ moving toward the driving end of the clutch.

Spider S, being splined to driving shaft $B^3$, rotates with driving shaft $B^3$. Lugs 173 are integral with spider S and rods T pierce one set of lugs 173 through holes 174 and fit tightly in holes 175 in the other set of lugs 173. The rods T are held firmly in lugs 173 of spider S by taper pins 176. Lugs 177 are integral with weights W and are slidable over rods T. Springs V are in tension and one set of the ends of springs V are attached to the lugs 177 of one of the weights W and the other set of ends of spring V are attached to the lugs 177 of the other weight W and the two weights are pulled toward the center of rotation of the clutch by the springs V.

Swivel members Y function the same as the trunnion blocks in the foregoing description. One set of ends of these swivel members Y have bifurcations 178 and the other set of ends have shaft portions 179. Shafts 181 fit tightly into holes 180 in the bifurcations 178 and are held in place by taper pins (not shown), which pierce one furcation of each member Y, through holes 182 and the shafts 181. Spiral gears $G^2$, which mesh with spur gear $C^2$, are mounted on shafts 181, on roller bearings (not shown) and are free to rotate about shafts 181. Shaft portions 179 of swivel members Y, are journaled in flanged bushings 183 located in holes 184 in spider S (see Fig. 15). The flat surfaces of flange portions 185 of the swivel members Y abut bosses on the spider S and prevent shaft portions 179 from moving longitudinally toward the driving end of the clutch.

Dogs X are keyed to the parts of the shaft portions 179, that protrude beyond the spider S, by keys and keyways 186 (see Fig. 15). The conventional spring ring and groove constructions 187 locate dogs X on shaft portions 179 so that dogs X cannot move along shaft portion 179 toward the driving end of the clutch. Bosses 188 on dogs X abut flange portions of bushings 183 and since the flat surfaces of flange portions 185 abut bosses on spider S, the shaft portions 179 of swivel members Y are located in spider S and the swivel members Y are free to turn in spider S.

Inside surfaces 189 of weights W are adapted to contact surfaces 190 of the dogs X, and when the weights W are in their limit positions toward the center of rotation of the clutch members, surfaces 189 and 190 have their maximum surface contact and the dogs X are held in their full line positions as disclosed in Fig. 16. When the dogs X are in their full line positions as disclosed in Fig. 16, since dogs X are keyed to shaft portions 179 of swivel members Y, swivel members Y are in positions in which the spiral gears $G^2$ will idle if driving shaft $B^3$ is rotating. Springs V normally cause surfaces 189 of weights W and surfaces 190 of dogs X to be in maximum contact, since springs V normally pull weight W toward the center of rotation of the clutch parts.

Projections 192 of the weights W (see Fig. 16) are adapted to fit into notches 191 in the outer extremities of the dogs H when they contact each other. When the weights W are moved to their maximum position away from the center of rotation, due to centrifugal force caused by the rotation of shaft $B^3$, shaft portions 179 of swivel members Y turn in their bushings 183 since spiral gears $G^2$ meshing with spur gears $C^2$ cause the swivel members Y to tilt, which in turn cause their shaft portions 179 to turn, all which is more fully explained in the description of the operation of the clutch. Dogs X, being keyed to shaft portions 179, turn with the shaft portions 179 and when the weights W move outwardly, the dogs move into positions such that the projections 192 of the weights W enter the notches 191 of the dogs X and the dogs X are locked in the position they have taken up until the weights W move inwardly toward the center of rotation of the clutch parts.

Bifurcated projections 193 are integral with weights W, and one of these projections is shown broken away in Fig. 16. One set of ends of links 194 fit into the bifurcation of one of the projections 193 and pins 195 fit tightly in holes in the bifurcations of projections 193 and fit loosely in holes in one set of ends of links 194 and links 194 are free to oscillate about pins 195. Pins 195 are held in place by having heads, on one set of their ends, that fit against the sides of one set of furcations of projections 193 and by the conventional spring ring and groove constructions at their other set of ends. The other set of ends of links 194, fit into bifurcation of projections 196 which are integral with shifting member Z. Pins 197 fit tightly in the bifurcation of projections 196 and loosely in links 194 and links 194 are free to oscillate about pins 197. These pins 197 are held in place by having heads on one set of their ends and by the conventional spring ring and groove constructions at their other set of ends.

Shifting member Z is movably splined on driving shaft $B^3$. An annular groove 198 in shifting member Z is adapted to receive the ends of shifting fingers 199. Shifting fingers 199 are rotatively attached in any suitable manner to shaft 200. Shaft 200 is journaled in any suitable manner in the sides of the housing (not shown), protrudes on the outside of the housing and is adapted to receive a link (also not shown) for the purpose of transmitting rotative movement to the shaft 200.

Two partial semi-circular brake shoes 202 have braking surfaces 203, which are adapted to contact braking surfaces 204 formed on the inside of the head $R^2$ of the housing (see Figs. 15 and 18). Projections 205, integral with brake shoes 202, fit slidably into grooves 206 in the end of spur gear $C^2$ and these grooves 206 and projections 205 form guides for the movement of the brake shoes 202. A semi-circular shaped annular groove 207 in the outside surface of the brake shoes 202, receives a circular coil spring 208 which completely encircles both brake shoes 202 and normally holds the brake surfaces 203 of the brake shoes 202 against the brake surface 204 formed on the inside of the head $R^2$ of the housing and prevents spur gear $C^2$ from turning when spiral gears $G^2$ are idling and prevents "drag," as this term has been defined in the foregoing. A ring 209 fits tightly on the outside cylindrical surface of the end projection of spur gear $C^2$ and functions to limit the travel of the brake shoes outwardly away from the center of rotation of the clutch parts when the brake shoes 202 respond to centrifugal force. This is accomplished by the outer ends of projections 205, integral with the brake shoes 202, contacting the inside surface of ring 209. Brake shoes 202 are prevented from moving longitudinally in one direction by their inner faces slidably abutting the face on the end of spur gear $C^2$ and prevented from moving in the other direction longitudinally by the surfaces 210 of the brake shoes 202 (see Fig. 18), slidably contacting the inner flat surface of ring 168 (see Fig. 15).

The following is a description of the operation of the mechanism just described. Assuming that the driving shaft $B^3$ is rotating in either direction of rotation at a speed insufficient to cause the weights W, due to centrifugal force, to move outwardly away from the center of rotation and overcome the pull of the springs V, then the swivel members Y will be held by contact of the inner surfaces 189 of the weights W with the surfaces 190 of dogs X, in the positions such that the spiral gears $G^2$ will idle as the rotation of the spider carries them around spur gear $C^2$ and no power will be transmitted by the driving shaft $B^3$ to driven gear $C^2$. During this idling of spiral gears $G^2$, the force required to idle spiral gears $G^2$, tends to drive spur gear $C^2$, but circular spiral spring 208 holds the surfaces 203 of brake shoes 202 against the brake surface 204 and the friction between these two brake surfaces 203 and 204 prevents spur gear $C^2$ from rotating. Spur gear $C^2$ being integral with driven shaft $A^2$, it follows that no driving power will be transmitted to driven shaft $A^2$ due to the idling of spiral gears $G^2$. In the foregoing manner, this characteristic of "drag" so common in the performance of automatic clutches is eliminated.

Assuming, that the driving shaft $B^3$ and spider S are rotating in either direction of rotation and have reached a predetermined speed at which the weights W will overcome the pull of springs V, the weights will move outwardly away from the center of rotation due to centrifugal force until the lugs 177 of the weights W have firmly contacted the lugs 173 integral with spider S. Since the inner surfaces 189 of the weights W have moved away from the surfaces 190 of the dogs X when the lugs 177 of the weights W have contacted the lugs 173, spider S carrying the spiral gears $G^2$ around spur gear $C^2$ causes shaft portions 179 of the swivel members Y to turn in the bushings 183 in the spider S and dogs X may now turn from their full line positions to their broken line positions, as disclosed in the upper half of Fig. 16. This turning movement of swivel member Y permits the tops of the teeth of spiral gears $G^2$ to contact the bottom of the tooth spaces of gear $C^2$ and a positive driving connection is established between spiral gears $G^2$ and spur gear $C^2$. When the weights W moved outwardly away from the center of rotation and the dogs X turned to their broken line positions shown in the upper half of Fig. 16, one set of projections 192, integral with the weights W, entered and fitted into notches 191 of dogs X, as shown in broken lines in Fig. 16. When these projections 192 are fitted into these notches 191 of the dogs X, the dogs X are locked against turning in either direction and any force tending to turn them only exerts a side thrust on the rods T. When spiral gears $G^2$ have positive driving connection, as afore described, with spur gear $C^2$, this driving connection cannot be disrupted until the weights W move inwardly toward the center of rotation. This can be caused only by the shaft $B^3$ and spider S having a speed less than the predetermined speed so that the springs V exert a greater pull inward toward the center of rotation than the weights W, due to centrifugal force, would exert outwardly away from the center of rotation. When the weights W start to move in toward the center of rotation the outward sloping sides of the projections 192 and the inward sloping sides of the notches 191 of the dogs X coinciding result in an incline plane construction that gives a large mechanical advantage to the movements of the weights inwardly toward the center of rotation, which transmitted through the swivel members Y, gives the movement of the weights inwardly, as just described, a large mechanical advantage to cause rolling of spiral gears $G^2$ out of positive driving connection with spur gear $C^2$. When or shortly after a positive driving connection is had between spiral gears $G^2$ and a spur gear $C^2$, brake shoes 202, responding to the centrifugal force due to their rotation with spur gear $C^2$, overcome the force of circular spiral spring 208 and the brake shoes 202 move outwardly away from the center of rotation and the brake surfaces 203 of the brake shoes clear the brake surface 204 formed on the inside of head $R^2$ of the housing.

When the speed of the driving shaft $B^3$ and spider S become sufficiently less than a predetermined speed, the springs V overcome the centrifugal force of the weights W and turn dogs X about their axes until the inner surfaces 189 of the weights W have maximum surface contact with surfaces 190 of the dogs X. This turning of the dogs X turns swivel members Y and causes spiral gears $G^2$ to roll out of positive driving connection with spur gear $C^2$, spiral gears $G^2$ being carried by swivel members Y as afore described. Thus, the driving connections between the driving shaft $B^3$ and driven shaft $A^2$ are disconnected and since the inner surfaces 189 of the weights W are in maximum surface contact with the surfaces 190 of the dogs X, the spiral gears $G^2$ are in position to idle and no driving force is imparted to driven spur gear $C^2$.

When the positive driving connections between spiral gears $G^2$ and spur gear $C^2$ are disrupted, ordinarily the speed of spur gear $C^2$ and driven shaft $A^2$ would decrease until the circular coil spring 208 would overcome the centrifugal force offered by the revolving brake shoes 202 and the braking surfaces 203 of the brake shoes would be caused to contact the braking surface 204 and the friction established between braking surfaces 203 and 204 would retard or stop the rotations of spur gear $C^2$ and driven shaft $A^2$. If for any reason during the performance of the clutch, the driven shaft $A^2$ attempted to rotate faster than the driving shaft $B^3$ while the driving shaft $B^3$ was at the time rotating at or faster than said predetermined speed of the driving shaft $B^3$, it would be necessary that the torque of the driven shaft $A^2$ be of such magnitude as to tend to increase the speed of the driving shaft $B^3$. But, if the speed of the driving shaft $B^3$ was at a lower speed than said predetermined speed of shaft $B^3$ such that the driving connections between spiral gears $G^2$ and spur gear $C^2$ were disrupted, and for any reason the driven shaft $A^2$ attempted to rotate faster than the driving shaft $B^3$ at that time, there would be no resistance offered by the driving shaft $B^3$ to this faster speed of the driven shaft $A^2$, which would also mean a faster speed of spur gear $C^2$, integral with driven shaft $A^2$, and the faster speed of spur gear $C^2$ would only cause spiral gears $G^2$ to idle at a faster speed about their own axes of rotation than they would otherwise idle.

The two sets of projections 192, integral with the weights W, and the two sets of notches 191 in dogs X are not operative at the same time. The reason for providing these two sets of projections 192 and the two sets of notches 191 is to permit the clutch to be driven in either direction of rotation; one set of projections 192 and one set of notches 191 being operative when the clutch is driven in one direction and the other set of projections 192 and notches 191 being operative when the clutch is driven in the opposite direction.

Since the pull of springs V, becomes greater as they are elongated by the movement of the weights W outwardly from the center of rotation and their pull is directly on the weights W, not being modified in any way by a combination of link connections before the predetermined speed of driving shaft B³ is attained at which the maximum elongations of the springs V are had, a "slippage performance" of the clutch can be had through a range of speed of the driving shaft B³ before the predetermined speed is had. This is accomplished by the partial tilting of the axes of rotation of the spiral gears G², about the axes of the shaft portions 179 of the swivel members Y, or in other words, when the spiral gears G² are in some positions between their idling positions and their positions in which the tops of the teeth of spiral gears G² contact the bottom of the tooth spaces of spur gear C². When the spiral gears G² are in some of these intermediate positions and are being carried about spur gear C² by the spider S, they will impart some driving force to the spur gear C² by only partially idling as they are carried around gear C² by the rotation of spider S, comparable to the full idling, that would occur if spur gear C² was at rest. The amount of slippage is controlled to some extent by the pull offered by circular coil spring 208 to cause friction between the braking surfaces 203 and 204 afore described.

When the weights W are moved outwardly away from the center of rotation, shifting member Z is moved toward the spider S over the splined portion of driving shaft B³. Likewise, when the weights W move inwardly, toward the center of rotation, shifting member Z is moved over the splined portion of driving shaft B³ away from the spider S. Shifting fingers 199 fit loosely into annular groove 198 in shifting member Z, and are suitably rotatively attached to shaft 200. When the shaft 200, which is adapted to be rotated manually, as afore described, is rotated counterclockwise (see Fig. 15), the shifting fingers 199 move shifting member Z toward the spider S and weights W are moved away from the center of rotation and, if driving shaft B³ is rotating at any speed, positive driving connections are had between spiral gears G² and spur gear C² since the swivel members Y are permitted to turn about the axes of their shaft portions 179, as the weights W have been moved to their maximum outward position, and dogs X may turn, dogs X being keyed to shaft portions 179. This permitting of the turning or tilting of swivel members Y, allows spiral gears G² to tilt and the tops of their teeth to contact the bottom of the tooth spaces of spur gear C² and positive driving connections are had between spiral gears G² and spur gear C².

When positive driving connections are had, between spiral gears G² and spur gear C², the weights W are at their maximum distance from the center of rotation and the shifting member Z is at the nearest point of its travel toward the spider S. If shaft 200 be rotated clockwise (see Fig. 15) under these conditions, shifting fingers 199, will move shifting member Z to its position as shown in Fig. 15, and through links 194 and their connections, weights W are pulled inwardly toward the center of rotation. This movement of the weights W causes dogs X to turn from their broken line positions to their full line positions as disclosed in Fig. 16. Dogs X being keyed to shaft portions 179 of swivel members Y, turn swivel members Y so that spiral gears G², carried by swivel members Y, are rolled out of their positive driving connections with spur gear C² and into their idling positions. When the shifting member Z is at its nearest point of travel toward spider S, the positions of links 194 relative to the weights W and shifting member Z produce a mechanical advantage favorable to the force applied to the shifting fingers 199 to disrupt the drive, since the positions of the links afford the advantage of a toggle joint.

Spiral gears have been employed in all the designs of clutches in this application, because of their quiet operation and positive action in this type of mechanism. Spur gears can replace the spirals, but in this construction, the centers of oscillation of the trunnion blocks or swivel members must be nearer the common center of rotation of the driving and driven shafts, and preferably between the pitch circle of the driven spur gear, integral with the driven shaft, and the common center of rotation of the driving and driven shafts. This spur gear construction is disclosed in applicant's abandoned application, Serial No. 600,084, filed June 18, 1945.

I claim:

1. A clutch having a driving element and a driven element rotatable about a common axis, the combination therewith of a gear having a driving connection with one of said elements, a member mounted in the other element for rotation relative thereto, a second gear, said second gear being mounted in said member for rotation relative thereto and adapted to mesh with the first said gear, said member and said second gear being rotatable about different axes, the axis of rotation of said member being spaced from the axis of the first gear and manually operated means to control the rotation of said member.

2. A clutch having a driving element and a driven element rotatable about a common axis, the combination therewith of a gear having a driving connection with one of said elements, a member mounted in the other element for rotation relative thereto, a second gear, said second gear being mounted in said member for rotation relative thereto, and adapted to mesh with the first gear, said member and said second gear being rotatable about different axes, the axis of rotation of said member being spaced from the axis of the first gear and automatic means to control the rotation of said member dependent on the speed of one of said elements.

3. A clutch having a driving element and a driven element rotatable about a common axis, the combination therewith of a gear having a driving connection with one of said elements, a member mounted in the other element for rotation relative thereto, a second gear, said second gear being mounted in said member for rotation relative thereto and adapted to mesh with the first gear, said member and said second gear being rotatable about different axes, the axis of rotation of said member being spaced from the axis of the first gear, and manually operated means to control the rotation of said member and also functioning as a brake to resist rotation of the driven element when disruption of the driving connections exist.

4. A clutch having a driving element and a driven element rotatable about a common axis, the combination therewith of a gear having a driving connection with one of said elements, a member mounted in the other element for rotation relative thereto, a second gear, said second gear being mounted in said member for rotation relative thereto, and adapted to mesh with the first gear, said member and said second gear being rotatable about different axes, the axis of rotation of said member being spaced from the axis of the first gear, automatic means to control the rotation of said member dependent on the speed of one of said elements, and means to offer resistance to the rotation of the driven element until a predetermined speed of said element is attained.

5. A clutch having a driving element and a driven element rotatable about a common axis, the combination therewith of a gear having a driving connection with one of said elements, a member mounted in the other element for rotation relative thereto, a second gear, said second gear being mounted in said member for rotation relative thereto and adapted to mesh with the first gear, said member and said second gear being rotatable about different axes, the axis of rotation of said member being spaced from the axis of the first gear, automatic means to control the rotation of said member, means to offer resistance to the rotation of the driven element until a predetermined speed of said element is attained and manually operated means over-riding said automatic control means to manually control the rotation of said member.

6. A clutch having a driving element and a driven element rotatable about a common axis, the combination therewith of a driven gear carried by one of said elements to rotate therewith, a gear adapted to act as a driving member and adapted to mesh with said driven gear, means rotatably carried by the other of said elements for supporting said driving member for rotation about its own axis and for rotation of its own axis about a second axis spaced from the axis of rotation of said driven gear and manually operated means to control the rotation of said driving member about said second axis of rotation.

7. A clutch having a driving element, and a driven element rotatable about a common axis, the combination therewith of a driven gear carried by one of said elements to rotate therewith, a gear adapted to act as a driving member and adapted to mesh with said driven gear, means rotatably carried by the other of said elements for supporting said driving member for rotation about its own axis and for rotation of its own axis about a second axis spaced from the axis of rotation of said driven gear and automatic means to control the rotation of said driving member about said second axis of rotation dependent on the speed of one of said elements.

8. A clutch having a driving element and a driven element rotatable about a common axis, the combination therewith of a driven gear carried by one of said elements to rotate therewith, a gear adapted to act as a driving member and adapted to mesh with said driven gear, means rotatably carried by the other of said elements for supporting said driving member for rotation about its own axis and for rotation of its own axis about a second axis spaced from the axis of rotation of said driven gear and manually operated means to control the rotation of said driving member about said second axis of rotation and also functioning as a brake to resist the rotation of the driven element when disruption of the driving connections exists.

9. A clutch having a driving element, and a driven element rotatable about a common axis, the combination therewith of a driven gear carried by one of said elements to rotate therewith, a gear adapted to act as a driving member and adapted to mesh with said driven gear, means rotatably carried by the other of said elements for supporting said driving member for rotation about its own axis and for rotation of its own axis about a second axis spaced from the axis of rotation of said driven gear, automatic means to control the rotation of said driving member about said second axis of rotation dependent on the speed of one of said elements and means to offer resistance to the rotation of the driven element until a predetermined speed of said element is attained.

10. A clutch having a driving element, and a driven element rotatable about a common axis, the combination therewith of a driven gear carried by one of said elements to rotate therewith, a gear adapted to act as a driving member and adapted to mesh with said driven gear, means rotatably carried by the other of said elements for supporting said driving member for rotation about its own axis and for rotation of its own axis about a second axis spaced from the axis of rotation of said driven gear, automatic means to control the rotation of said driving member about said second axis of rotation dependent on the speed of one of said elements, means to offer resistance to the rotation of the driven element until a predetermined speed of said element is attained and manually operated means over-riding said automatic control means to manually control the rotation of said member about said second axis of rotation.

11. A clutch having a driving element and a driven element rotatable about a common axis, the combination therewith of a gear having a driving connection with one of said elements, a member mounted in the other element for rotation relative thereto about an axis parallel to the axis of said gear, a spiral gear mounted in said member for rotation relative thereto and adapted to mesh with first said gear and manually operated means to control the rotation of said member.

12. A clutch having a driving element and a driven element rotatable about a common axis, the combination therewith of a gear having a driving connection with one of said elements, a member mounted in the other element for rotation relative thereto about an axis parallel to the axis of said gear, a spiral gear mounted in said member for rotation relative thereto and adapted to mesh with first said gear and manually operated means to control the rotation of said member and also functioning as a brake to resist rotation of the driven element when disruption of the driving connections exists.

13. A clutch having a driving element and a driven element rotatable about a common axis, the combination therewith of a gear having a driving connection with one of said elements, a member mounted in the other element for rotation relative thereto about an axis parallel to the axis of said gear, a spiral gear mounted in said member for rotation relative thereto and adapted to mesh with first said gear, and automatic means to control the rotation of said member dependent on the speed of one of said elements.

14. A clutch having a driving element and a driven element rotatable about a common axis, the combination therewith of a gear having a driving connection with one of said elements, a member mounted in the other element for rotation relative thereto about an axis parallel to the axis of said gear, a spiral gear mounted in said member for rotation relative thereto and adapted to mesh with first said gear, automatic means to control the rotation of said member dependent on the speed of one of said elements and additional means to offer resistance to the rotation of the driven element until a predetermined speed of said element is attained.

15. A clutch having a driving element and a driven element rotatable about a common axis, the combination therewith of a gear having a driving connection with one of said elements, a member mounted in the other element for rotation relative thereto about an axis parallel to the axis of said gear, a spiral gear mounted in said member for rotation relative thereto and adapted to mesh with first said gear, automatic means to control the rotation of said member dependent on the speed of one of said elements, additional means to offer resistance to the rotation of the driven element until a predetermined speed of said element is attained and manually operated means over-riding said automatic control means to manually control the rotation of said member.

16. A clutch having a driving element and a driven element rotatable about a common axis, the combination therewith of a gear having a driving connection with one of said elements, a member mounted on the other element for rotation relative thereto, a second gear, said second gear being mounted in said member for rotation relative thereto and adapted to mesh with the first said gear, said member and said second gear being rotatable about different axes, the axis of rotation of said member being located between the pitch circle of the first said gear and the common axis of rotation of said elements, and manually operated means to control the rotation of said member.

17. A clutch having a driving element and a driven element rotatable about a common axis, the combination therewith of a gear having a driving connection with one of said elements, a member mounted on the other element for rotation relative thereto, a second gear, said second gear being mounted in said member for rotation relative thereto, and adapted to mesh with the first gear, said member and said second gear being rotatable about different axes, the axis of rotation of said member being located between the pitch circle of the first said gear and the common axis of rotation of said elements and automatic means to control the rotation of said member dependent on the speed of one of said elements.

18. A clutch having a driving element and a driven element rotatable about a common axis, the combination therewith of a gear having a driving connection with one of said elements, a member mounted on the other element for rotation relative thereto, a second gear, said second gear being mounted in said member for rotation relative thereto, and adapted to mesh with the first gear, said member and said second gear being rotatable about different axes, the axis of rotation of said member being located between the pitch circle of the first said gear and the common axis of rotation of said elements, automatic means to control the rotation of said member dependent on the speed of one of said elements and means to offer resistance to the rotation of the driven element until a predetermined speed of said element is attained.

19. A clutch having a driving element and a driven element rotatable about a common axis, the combination therewith of a gear having a driving connection with one of said elements, a member mounted on the other element for rotation relative thereto, a second gear, said second gear being mounted in said member for rotation relative thereto and adapted to mesh with the first gear, said member and said second gear being rotatable about different axes, the axis of rotation of said member being located between the pitch circle of the first said gear and the common axis of rotation of said elements, automatic means to control the rotations of said member dependent on the speed of one of said elements, additional means to offer resistance to the rotation of the driven element until a predetermined speed of said element is attained and manually operated means over-riding said automatic control means to manually control the rotation of said member.

20. A clutch having a pair of elements rotatable about a common axis, the combination therewith of a gear carried by one of said elements to rotate therewith, a gear adapted to act as a driving member and adapted to mesh with the first said gear, means rotatably carried by the other of said elements for support of said driving member for rotation about its own axis and for rotation of its own axis about an axis spaced from the common axis of rotation of the said elements and automatic means dependent on the speed of one of said elements to establish and disrupt driving connections between the said driving member and the first said gear at predetermined speeds of one of said elements.

21. A clutch having a pair of elements rotatable about a common axis, the combination therewith of a gear carried by one of said elements to rotate therewith, a gear adapted to act as a driving member and adapted to mesh with the first said gear, means rotatably carried by the other of said elements for support of said driving member for rotation about its own axis and for rotation of its own axis about an axis spaced from the common axis of rotation of the said elements, automatic means dependent on the speed of one of said elements to establish and disrupt driving connections between the said driving member and the first said gear at predetermined speeds of one of said elements and means to offer resistance to the rotation of one of said elements until a predetermined speed of last said element is attained.

CARROLL H. RICHARDS.

REFERENCES CITED

The following references are of record in the file of this patent:

UNITED STATES PATENTS

| Number | Name | Date |
|---|---|---|
| 1,946,877 | Parker | Feb. 13, 1934 |
| 2,044,475 | Kelly | June 16, 1936 |
| 2,407,099 | Richards | Sept. 3, 1946 |

FOREIGN PATENTS

| Number | Country | Date |
|---|---|---|
| 10,425 | Great Britain | of 1908 |